United States Patent [19]
Moleé

[11] Patent Number: 5,517,336
[45] Date of Patent: May 14, 1996

[54] DISPLAY CARD WITH INTERACTIVE IMAGERY AND METHOD OF PRODUCING SAME

[75] Inventor: Warren F. Moleé, Laguna Niguel, Calif.

[73] Assignee: The Upper Deck Company, Carlsbad, Calif.

[21] Appl. No.: 382,123

[22] Filed: Feb. 1, 1995

Related U.S. Application Data

[63] Continuation of Ser. No. 116,330, Sep. 3, 1993, abandoned.

[51] Int. Cl.$^6$ .............................. G03H 1/02; G03H 1/04; B29D 7/01; B29D 11/00
[52] U.S. Cl. ........................... 359/1; 264/1.31; 264/1.34; 283/86; 359/3
[58] Field of Search ......................... 359/2, 3, 1; 283/86, 283/904; 264/1.3, 1.31, 1.33, 1.34

[56] References Cited

U.S. PATENT DOCUMENTS

| | | | |
|---|---|---|---|
| 4,547,141 | 10/1985 | Ruschmann | 359/3 |
| 4,773,718 | 9/1988 | Weitzen et al. | 359/3 |
| 4,856,857 | 8/1989 | Takeuchi et al. | 359/3 |

Primary Examiner—Martin Lerner
Attorney, Agent, or Firm—Cahill, Sutton & Thomas

[57] ABSTRACT

A display card is provided on one surface thereof with two images which appear to an observer to be interacting. One of the images is provided on the card by quality ink printing such as lithography. At least a portion of this image occupies but only a portion of a prescribed field of view on the card. The second image, which occupies substantially all of the remainder of the field of view, is provided by a plastic coating adhered to the card and having a reflection-type hologram embossed therein. The holographic image circumscribes and touches at every possible point that portion of the printed image occupying a portion of the field of view. The method of making the display card comprising ink printing one image and adhering the plastic coating bearing the hologram on the card in a manner to circumscribe that portion of the printed image which occupies the field of view. Adherence of the plastic coating is preferably accomplished with a heated metal die having a relief area corresponding to that portion of the printed image which occupies a portion of the field of view.

14 Claims, 2 Drawing Sheets

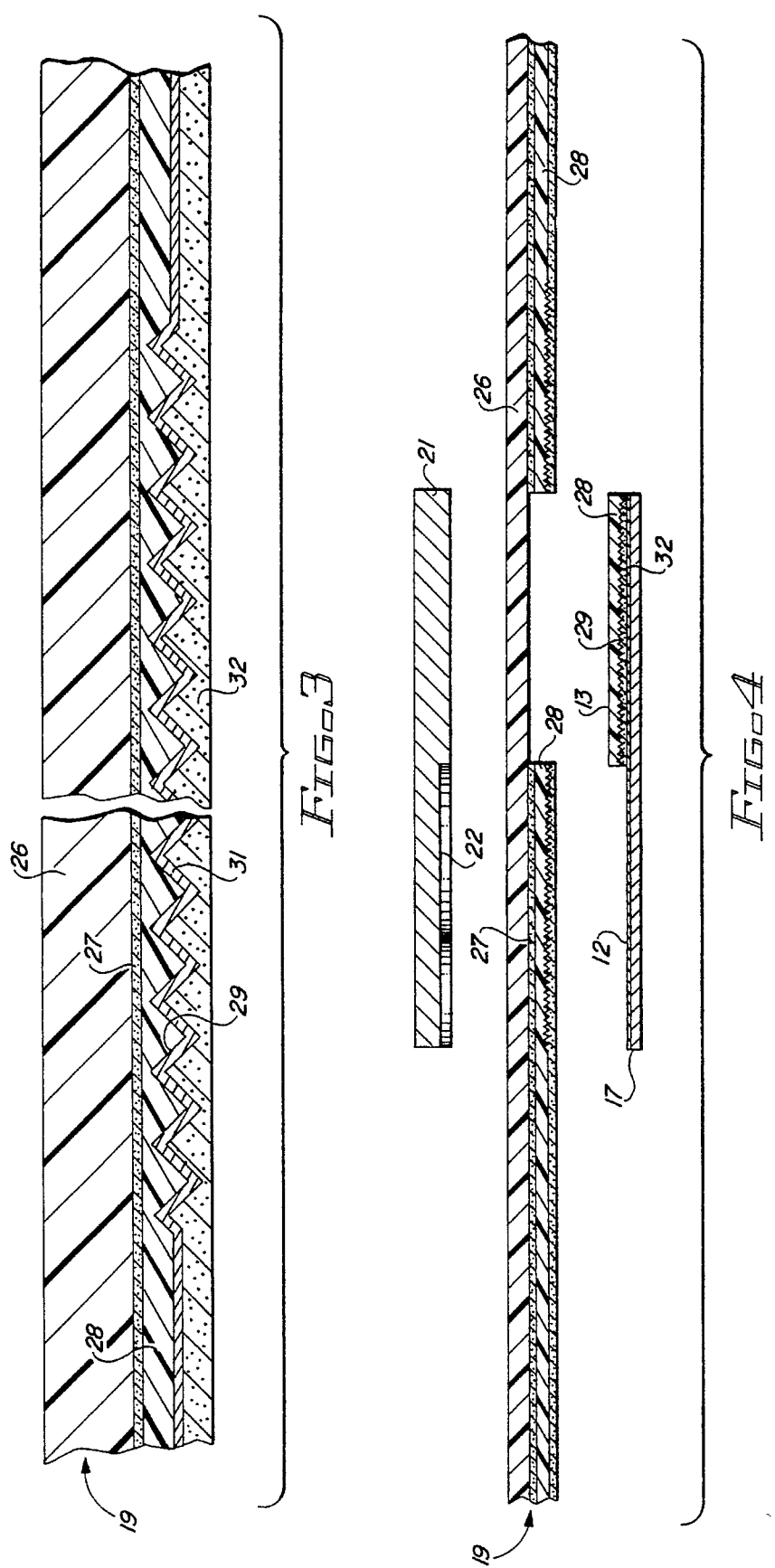

DISPLAY CARD WITH INTERACTIVE IMAGERY AND METHOD OF PRODUCING SAME

This application is a Continuation of U.S. patent application Ser. No. 08/116,330, filed Sep. 3, 1993, now abandoned.

TECHNICAL FIELD

This invention is concerned with enhancing the attractiveness and value of collector display cards.

BACKGROUND ART

Collecting and trading cards depicting the likenesses of and statistics concerning athletes is a very popular hobby. What started years ago as a fad of collecting baseball player cards distributed as premiums in bubble gum packages has grown into a multi-million dollar business with attractively printed cards being sold on their own merit. And, such cards today bear the likenesses of a variety of athletes from baseball players, to basketball players, to football players, to race car drivers and others.

In an effort to make its cards more unique, the Upper Deck Company, assignee of this patent application, several years ago adopted the practice of applying small hot stamped diffraction grating patterns to the face of its cards. These diffraction grating patterns are created by micro-embossing the pattern into the surface of a thin plastic coating using procedures described in *Understanding Holography* by Michael Wenyon, Arco Publishing, Inc., New York, Copyright 1978–1985 by Michael Wenyon (see pages 76–78).

Some attempts have been made to enhance the attractiveness of trading cards by combining two holographic images. Unfortunately, the images thus produced tend to be dim and dull.

DISCLOSURE OF THE INVENTION

This invention enhances the attractiveness and value of collector cards by providing an interactive image display on at least one surface of the cards. The invention contemplates ink printing one quality image on the surface of the card, with at least a portion of that image occupying a portion only of a prescribed field of view on the card. This image can be, for example, a full color, lithographic printed picture of a ball player. The invention further contemplates that substantially all the remainder of the field of view on the card have adhered thereto a second image in the form of a hot stamping foil reflection-type hologram. The hologram of the second image circumscribes and touches at every possible point that portion of the printed image which occupies a portion of the field of view. The holographic image creates a picture which appears to be spaced rearwardly from and provide a background for the ink printed image which stands out vividly against the background. The holographic image may, for example, provide a game action picture of the subject athlete with portions of the sporting arena and fans visible in the background. Or the holographic image may be on the same image plane or above the image plane of the ink printed image. In another embodiment of the invention, the holographic image may take the form of a three dimensional image rather than a two-dimensional image offset from the viewing surface.

There is an interactive effect created by combining a lithographic printed image with a three-dimensional holographic image in that when the card is tilted back and forth with reference to the observer's line of sight, the three-dimensional holographic image appears to move. Such movement gives the impression that the viewer is actually seeing around and behind the player depicted in the ink printed image.

This invention is also concerned with the method of producing the collector card in which the hot stamping coating with the holographic image embossed therein is heat transferred to the card, preferably by hot die stamping, to closely circumscribe the ink printed image.

BRIEF DESCRIPTION OF THE DRAWINGS

The invention is described in greater detail hereinafter by reference to the accompanying drawings, wherein:

FIG. 3 is a greatly enlarged sectional view through a multi-layer web employed to transfer a holographic image to the display card; and FIG. 4 is a sectional view illustrating the manner in which a holographic image is applied to the display card.

BEST MODES FOR CARRYING OUT THE INVENTION

Figure 1:
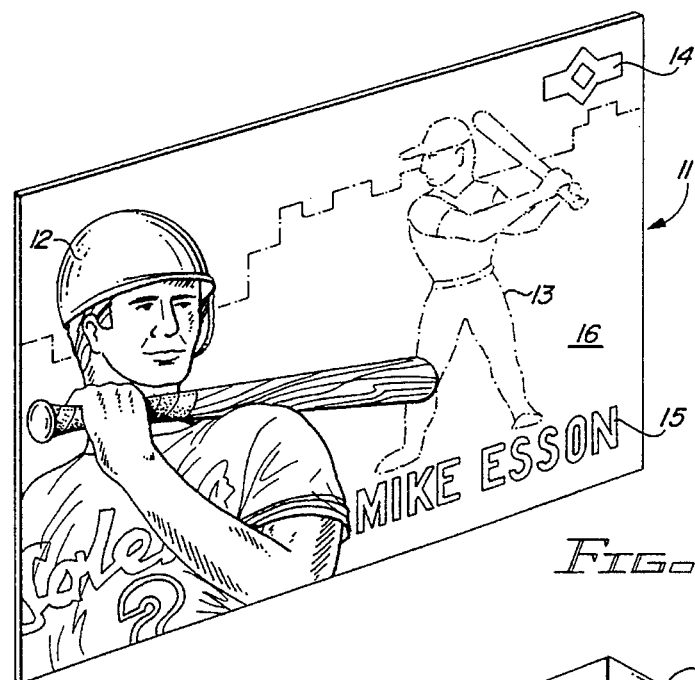
FIG. 1 is a perspective view of a display card embodying the invention.

Referring particularly to FIG. 1, the collector display card there illustrated and identified generally by the reference numeral 11 possesses an ink printed image 12 of a baseball player and a holographic image 13, preferably of the same athlete. Display card 11 may also have appearing thereon a logo, or symbol, 14 identifying the producer of the card and lettering 15 giving the name of the athlete, in this instance a fictional "Mike Esson".

The display card 11 presents to the observer a prescribed field of view 16 which is occupied entirely by the holographic image 13 with the exception of the printed image 12, the logo 14, and the lettering 15. For the particular card 11 illustrated in the drawing, the field of view 16 is coextensive with the entire height and width of the card. It should be understood, however, that the field of view 16 can be prescribed as less than the entire surface area of the card 11 if desired for aesthetic or other reasons.

So far as this invention is concerned, it is important that at least a portion of the ink printed image 12 of the player occupy a portion only of the field of view 16 and that the holographic image 13 occupy a substantial portion of the remaining field of view and circumscribe and touch at every possible point that portion of the printed image which occupies a portion of the field of view. On a card in which the prescribed field of view is less than the dimensions of the card, the ink printed image 12 may have a significant portion thereof outside the field of view in addition to having a portion within the field of view.

As illustrated in FIG. 1, the ink printed image 12 or first image element 12 depicts a closeup or large scale image of a sports player while the background holographic image within field of view 16 depicts a smaller scale second image element as a background element which has the resulting appearance of being visually offset behind the surface of substrate 17 on which the printed first image element resides. In reality, both the first and second image elements are physically formed on the same plane as defined by the surface of substrate 17.

Figure 2:
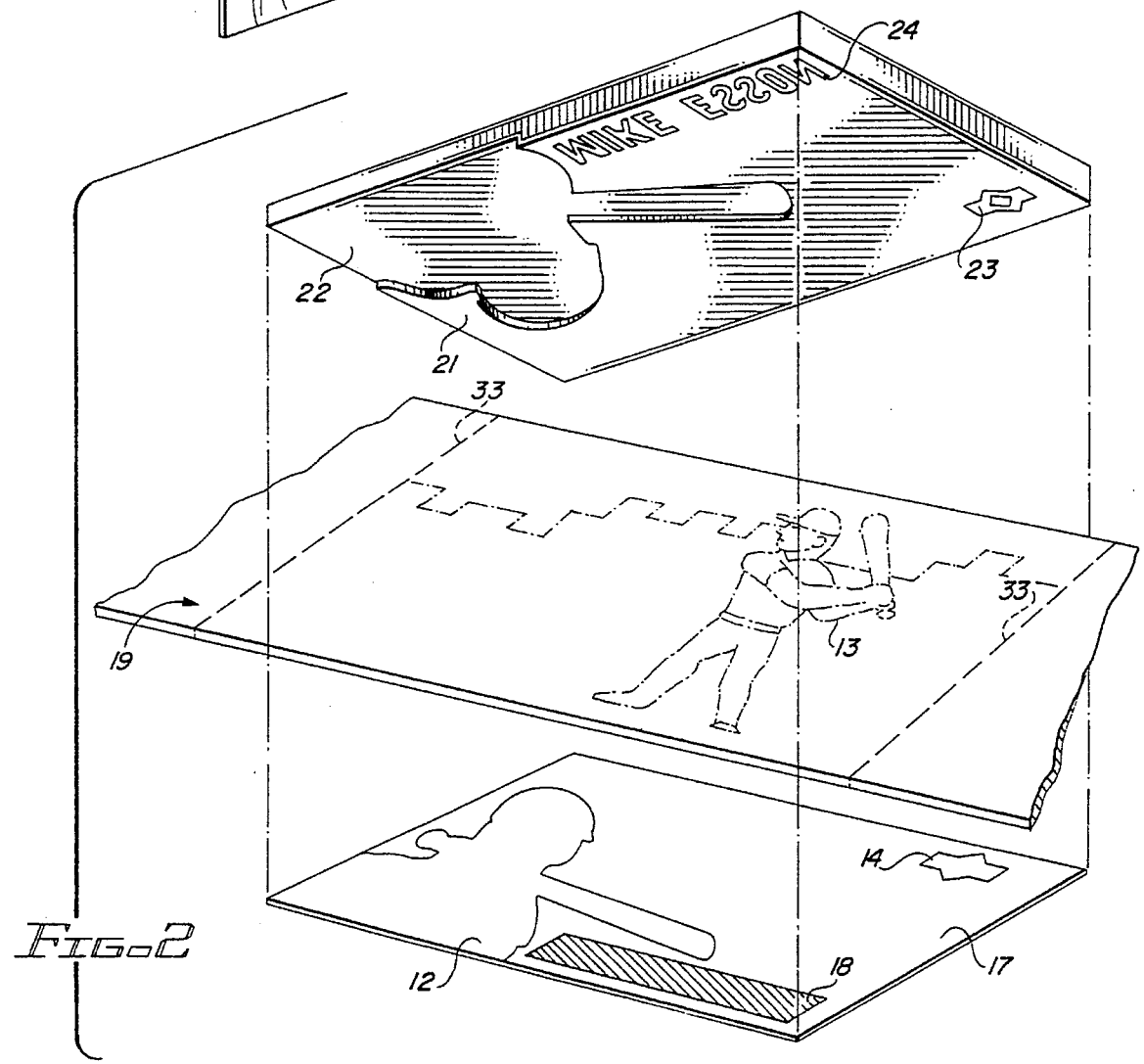
FIG. 2 is an exploded view illustrating a hot stamping step employed in the method of the invention.

As illustrated in FIGS. 1 and 2, the first image element may include a two-dimensional lithographic reproduction 12 of a selected portion of a character (such as the baseball character illustrated in FIG. 1) having an exterior contour where the character contour defines the contour or perimeter shape of the first image element.

As most clearly illustrated in the lower level depiction of substrate 17 in FIG. 2, the first image element includes a first area, a perimeter, and a contour while the second image element includes a second area, a perimeter and a contour. A segment of the overall perimeter of the first image element coincides with a segment of the overall perimeter of the second image element to form a shared perimeter segment having a contour defined by the contour of the first image element.

FIG. 2 illustrates several of the steps involved in the production of the display card of this invention. There is first provided a self-supporting substrate 17 having an optically opaque surface especially adapted for receiving the ink printed image 12 and the holographic image 13. For most collector and trading card applications, this will be a coated paperboard specially prepared to receive the printed image and the adhesively attached holographic image. Coated cover weight and coated book weight stocks are suitable for this application. One such board is presently available from Noland Paper in 15 Pt. and identified by the trademark "encore".

Using conventional printing techniques, preferably lithographic printing for high quality images, the printed player image 12, and the logo 14 are printed on the surface of the card substrate 17. This is preferably a full color image. Inks available from INX, Gans, or Spectrum and identified as "wax free offset inks" are suitable for this purpose. In addition, a continuous, opaque strip 18 of ink can be printed on the substrate to provide show-through lettering 15 as described below.

The holographic image is transported to the card substrate 17 by means of a web 19 of hot stamping foil. The holographic image is actually transferred to and adhered to the card substrate 17 by a hot stamping technique employing a heated metal die 21.

"Hot stamping" is a technique commonly used to apply a decorative finish to a substrate. The technique is described in an article by Harry Parker entitled "Hot stamping" appearing at Pages 516 and 518 in a 1974–1974 *Modern Plastic Encyclopedia*, which article is incorporated herein by reference.

In accordance with this invention, the perimeter of field of view 16, when hot stamped onto the card substrate 17, should closely circumscribe, but not overlap or obscure the perimeter of the printed player image 12 and the perimeter of logo 14 previously printed on the substrate. To achieve this geometric relationship, the metal die 21 is provided with relief areas 22 and 23, respectively, configured to coincide with the surface areas and with the outlines or perimeters of the player image 12 and the logo 14. When the heated die 21 presses the holographic image carrying the foil web 19 against card substrate 17, the relief areas 22 and 23 do not contact the web so the holographic image is not transferred in these areas. In addition, the die 21 may be provided with relief lettering 24 so no holographic image is transferred in the pattern of the letters, leaving portions of the printed opaque strip 18 to show therethrough, thus producing see-through lettering.

The relieved die 21 is preferably formed from a soft metal such as copper or aluminum which is photoetched to the configuration desired.

A preferred construction for the hot stamping foil web 19 is illustrated in FIG. 3. The several layers of the foil are not drawn to scale. The top layer 26 is the carrier and is preferably formed from a strong, heat-resistant plastic, such as polyester, having a thickness of from 0.05 to 1.0 mil. Applied to the carrier 26 is a release coat 27, usually paraffin wax or a special resin, designed to melt when the heated die is applied to the substrate. A product available from Transfer Print Foils, 9 Cotter Lane, East Brunswick, N.J. 08816 and identified as "W1-Wax release" is suitable for this layer. The next layer 28 is an ultraviolet curable coating having the pattern 29 of the holographic image 13 embossed into its under surface.

Layer 28 must possess several important physical characteristics. First, it must be tough enough to retain the holographic pattern 29 during the hot stamping process. Second, the web must be frangible so that the hot stamped area releases from the other areas of the layer which remain attached to the carrier 26 following hot stamping. A coating of a material also obtained from Transfer Print Foils under the designation "3460" and having a thickness of $1/32$ mil to $1/16$ mil possesses these characteristics.

Applied to the under surface of the holographic pattern layer 28 is a vacuum-deposited, thin metallic layer 31. An aluminum metal layer 20 to 25 OHMS or 2.0 to 2.2 optical density thick is sufficient to give good reflection to light falling on the holographic pattern 29 in layer 28.

If desired, the metallic layer 31 may be applied to plastic layer 28 before the holographic image is embossed into the plastic. The term "hot stamping layer" refers either to layer 28, to layer 28 plus layer 31 or to additional layer components of the hot stamping foil web which are transferred to substrate 17 during the hot stamping process.

Lastly, there is applied to the metallic layer a layer 32 of heat activatable adhesive which is employed to adhere the holographic pattern layer and the metallic layer to the card substrate 17. In the trade, this is sometimes referred to as a "size coat" and a material identified as Size Coat 9P7 manufactured by Transfer Print Foils is a suitable adhesive material.

FIG. 4 illustrates the step of adhering the holographic image 13 to the card substrate 17. Again, the layers of material depicted here are not to scale. The condition here illustrated occurs after the heated die 21 has pressed the stamping foil web 19 against the card substrate 17, the die has been lifted, and the polyester carrier 26 has been lifted clear of the card substrate 17. In areas where the die 21 contacts the foil web 19, the paraffin release coat 27 has been melted to release corresponding areas of the layer 28 bearing the holographic pattern. Conversely, the heat and pressure applied to the foil 19 and the substrate 17 in the same areas have been sufficient to activate the adhesive layer 32 to adhere portions of the holographic layer to the substrate. The adhered areas of layer 28 break away from other areas of layer 28 when the foil 19 is peeled from the substrate.

Materials for the release coat 27 and the adhesive layer 32 are selected so that both respond to the temperature condition imparted by the heated die 21, usually a temperature within the range of 245°–300° F.

Because the web of hot stamping foil 19 is quite thin, flexible, and somewhat elastic, care must be taken in feeding the web through the hot stamping process, particularly if high speed equipment is used. To compensate for shifting of the holographic image with respect to the stamping die 21, it is desirable to provide a holographic image 13 on foil web 19 whose dimensions exceed those of the die 21 as indicated by dotted lines 33 in FIG. 2.

It is also desirable to employ some mechanism (not shown) for optically reading the holographic image on the hot stamping foil 19 to register the holographic image 13 with the ink print image 12. A device suitable for this purpose is available from Total Register, Inc., 4 Production Drive, Brookfield, Conn. 06804.

The production of hot stamping foils with holographic images as described above are well within the skills of persons familiar with this art. One company skilled in the production of such foils using standard photographic prints as a starting point is Transfer Print Foils, 9 Cotter Lane, East Brunswick, N.J. 08816.

From the foregoing, it should be apparent that this invention provides an enhanced display card and method for making same.

What is claimed is:

1. A display card depicting a composite image comprising:
   a. a substrate having an optically opaque surface adapted to receive within a defined area a composite complementary image having separate, non-intersecting first and second image elements, the first image element having a first area, a perimeter and a contour, the second image element having a second area, a perimeter and a contour, a segment of the perimeter of the first image element coinciding with a segment of the perimeter of the second image element to form a shared perimeter segment having a contour defined by the contour of the first image element;
   b. a reproduction of the first image element printed directly on the surface of the substrate within the defined area, the reproduction having an outer surface which remains exposed to ambient light;
   c. a hot stamping layer affixed to the substrate surface and having an area, a perimeter and a contour substantially coincident with the area, the perimeter and the contour of the second image element; and
   d. an embossed holographic reproduction of the second image element formed on the interior surface of the hot stamping layer, the printed reproduction of the first image element and the hot stamping layer with the embossed second image element being aligned within the defined area of the substrate surface along the shared perimeter segment to form the composite complementary image.

2. The display card of claim 1 wherein the printed reproduction of the first image element represents a lithographic reproduction.

3. The display card of claim 1 wherein the composite image includes a foreground element and a background element and wherein the first image element depicts the foreground element and the second image element depicts the background element.

4. The display card of claim 1 wherein the hot stamping layer includes a transparent coating layer and a metal layer and wherein the metal layer is affixed to the substrate surface by a heat-activated adhesive layer.

5. The display card of claim 4 wherein the embossed holographic reproduction of the second image element represents a reflection-type holographic image.

6. The display card of claim 1 further including a heat-activated adhesive layer disposed between the substrate surface and the hot stamping layer.

7. The display card of claim 1 wherein the second image element depicts a defined field of view and wherein the first image element is positioned within the defined field of view.

8. The display card of claim 1 wherein the composite image depicts a defined field of view and includes a foreground element and a background element and wherein the first image element depicts the foreground element and the second image element depicts the background element.

9. The display card of claim 1 wherein the first image element includes a two-dimensional lithographic reproduction of a selected portion of a character having a contour where the character contour defines the contour of the first image element.

10. A method of producing a display card depicting a composite image comprising the steps of:
   a. providing a self-supporting substrate having an optically opaque surface with a defined area adapted to receive within first and second non-intersecting areas a composite complementary image having separate first and second image elements, the first image element having a first area, a perimeter and a contour, the second image element having a second area, a perimeter and a contour, where a segment of the perimeter of the first image element coincides with a segment of the perimeter of the second image element to form a shared perimeter segment having a contour defined by the contour of the first image element, the first area of the substrate surface and the first area of the composite complementary image having substantially coincident areas and contours;
   b. reproducing the first image element directly on the surface of the substrate within the first area, the reproduced first image having a two-dimensional image characteristic with an outer surface which remains exposed to ambient light;
   c. providing a web of hot stamping foil including a carrier, a heat-activated release layer and a hot stamping layer having interior and exterior surfaces, the release layer securing the interior surface of the hot stamping layer to the carrier;
   d. embossing a holographic reproduction of the second image element into a second area of the exterior surface of the hot stamping layer to transfer to the exterior surface of the hot stamping layer a holographic reproduction of the second image element, the embossed second area of the hot stamping layer having an area, a perimeter and a contour substantially coincident with the area, the perimeter and the contour of the original second image element;
   e. coating the embossed exposed surface of the hot stamping layer with a heat-activated adhesive;
   f. providing a hot stamping die having a stamping surface including a raised non-transfer area having a first area, a perimeter and a contour formed within the stamping surface to coincide with the location of the first area of the composite image and an image transfer area having a second area, a perimeter and a contour positioned with respect to the stamping surface to coincide with the location of the second image element of the composite image, the hot stamping die being heated to a temperature suitable to activate both the hot stamping foil release coat and the head-activated adhesive;
   g. registering the stamping surface of the stamping die with the hot stamping foil web and with the substrate surface, with the web positioned between the die and the substrate surface such that the image transfer area of the stamping surface, the embossed second area of the hot stamping layer and the second area of the substrate surface are aligned; and h. displacing the hot stamping die toward and away from the substrate surface to transfer the embossed second area of the hot stamping layer from the hot stamping foil to the second area of the substrate surface to yield a substrate bearing the complementary image including the two-dimensional reproduction of the first image element within the first area and the holographic reproduction of the second image element within the second area.

11. The method of claim 10 including the further step of depositing a reflective metal layer on the exterior surface of the hot stamping layer before the embossing step and wherein the metal layer is coated with the heat-activated adhesive.

12. The method of claim 10 including the further step of depositing a reflective metal layer on the exterior surface of the hot stamping layer after the embossing step and wherein the metal layer is coated with the heat-activated adhesive.

13. A method of producing a display card depicting a composite image comprising the steps of:

a. providing a self-supporting substrate having an optically opaque surface with a defined area adapted to receive within first and second non-intersecting areas a composite complementary image having separate first and second image elements, the first image element having a first area, a perimeter and a contour, the second image element having a second area, a perimeter and a contour where a segment of the perimeter of the first image element coincides with a segment of the perimeter of the second image element to form a shared perimeter segment having a contour defined by the contour of the first image element, the first area of the substrate surface and the first area of the composite complementary image having substantially coincident areas and contours;

b. reproducing the first image element directly on the surface of the substrate within the first area, the reproduced first image having a two-dimensional image characteristic with an outer surface which remains exposed to ambient light;

c. providing a web of hot stamping foil including a carrier, a heat-activated release layer and a hot stamping layer having interior and exterior surfaces, the release layer securing the interior surface of the hot stamping layer to the carrier;

d. depositing a reflective metal layer on the exterior surface of the hot stamping layer;

e. embossing a holographic reproduction of the second image element into a second area of the metal layer to transfer to the hot stamping a holographic reproduction of the second image element, the embossed second area of the hot stamping layer having an area, a perimeter and a contour substantially coincident with the area, the perimeter and the contour of the original second image element;

f. coating the embossed exposed surface of the metal layer with a heat-activated adhesive;

g. providing a hot stamping die having a stamping surface including a raised non-transfer area having a first area, a perimeter and a contour formed within the stamping surface to coincide with the location of the first area of the composite image and an image transfer area having a second area, a perimeter and a contour positioned with respect to the stamping surface to coincide with the location of the second image element of the composite image, the hot stamping die being heated to a temperature suitable to activate both the hot stamping foil release coat and the heat-activated adhesive;

h. registering the stamping surface of the stamping die with the hot stamping foil web and with the substrate surface, with the web positioned between the die and the substrate surface such that the image transfer area of the stamping surface, the embossed second area of the hot stamping layer and the second area of the substrate surface are aligned; and i. displacing the hot stamping die toward and away from the substrate surface to transfer the embossed second area of the hot stamping layer and the metal layer from the hot stamping foil to the second area of the substrate surface to yield a substrate bearing the complementary image including the two-dimensional reproduction of the first image element within the first area and the holographic reproduction of the second image element within the second area.

14. A method of producing a display card depicting a composite image comprising the steps of:

a. providing a self-supporting substrate having an optically opaque surface with a defined area adapted to receive within first and second non-intersecting areas a composite complementary image having separate first and second image elements, the first image element having a first area, a perimeter and a contour, the second image element having a second area, a perimeter and a contour where a segment of the perimeter of the first image element coincides with a segment of the perimeter of the second image element to form a shared perimeter segment having a contour defined by the contour of the first image element, the first area of the substrate surface and the first area of the composite complementary image having substantially coincident areas and contours;

b. reproducing the first image element directly on the surface of the substrate within the first area, the reproduced first image having a two-dimensional image characteristic with an outer surface which remains exposed to ambient light;

c. providing a web of hot stamping foil including a carrier, a heat-activated release layer and a hot stamping layer having interior and exterior surfaces, the release layer securing the interior surface of the hot stamping layer to the carrier;

d. embossing a holographic reproduction of the second image element into a second area of the exterior surface of the hot stamping layer to transfer to the hot stamping foil a holographic reproduction of the second image element, the embossed second area of the hot stamping layer having an area, a perimeter and a contour substantially coincident with the area, the perimeter and the contour of the original second image element;

e. depositing a reflective metal layer on the exterior surface of the hot stamping layer;

f. coating the embossed exposed surface of the metal layer with a heat-activated adhesive;

g. providing a hot stamping die having a stamping surface including a raised non-transfer area having a first area, a perimeter and a contour formed within the stamping surface to coincide with the location of the first area of the composite image and an image transfer area having a second area, a perimeter and a contour positioned with respect to the stamping surface to coincide with the location of the second image element of the composite image, the hot stamping die being heated to a temperature suitable to activate both the hot stamping foil release coat and the heat-activated adhesive;

h. registering the stamping surface of the stamping die with the hot stamping foil web and with the substrate surface, with the web positioned between the die and the substrate surface such that the second transfer area of the stamping surface, the embossed second area of the hot stamping layer and the second area of the substrate surface are aligned; and i. displacing the hot stamping die toward and away from the substrate surface to transfer the embossed second area of the hot stamping layer and the metal layer from the hot stamping foil to the second area of the substrate surface to yield a substrate bearing the complementary image including the two-dimensional reproduction of the first image element within the first area and the holographic reproduction of the second image element within the second area.

* * * * *